US008717383B2

(12) United States Patent
Coldicott et al.

(10) Patent No.: US 8,717,383 B2
(45) Date of Patent: May 6, 2014

(54) AUTOMATIC MANAGEMENT OF DIAGRAM ELEMENTS

(75) Inventors: Peter A. Coldicott, Jonestown, TX (US); Eduardo T. Kahan, Longwood, FL (US); Velayoudame P. Mouttoucomarasamy, Beaverton, OR (US)

(73) Assignee: International Business Machines Corporation

( * ) Notice: Subject to any disclaimer, the term of this patent is extended or adjusted under 35 U.S.C. 154(b) by 904 days.

(21) Appl. No.: 12/198,890

(22) Filed: Aug. 27, 2008

(65) Prior Publication Data

US 2010/0058161 A1    Mar. 4, 2010

(51) Int. Cl.
*G09G 5/00*     (2006.01)
*G06T 11/60*    (2006.01)
*G06T 11/20*    (2006.01)
*G09G 5/14*     (2006.01)

(52) U.S. Cl.
CPC .............. *G06T 11/60* (2013.01); *G06T 11/206* (2013.01); *G06T 11/20* (2013.01); *G09G 5/14* (2013.01); *G09G 2340/10* (2013.01); *G09G 2340/125* (2013.01)
USPC ........... 345/629; 715/204; 715/243; 715/244; 715/249; 715/253; 715/273; 715/866

(58) Field of Classification Search
CPC .............. G09G 5/14; G09G 2340/10; G09G 2340/125; G06T 11/60; G06T 11/20; G06T 11/206
USPC .................. 345/629; 715/204, 243–247, 273, 715/517–521, 866, 253, 9
See application file for complete search history.

(56) References Cited

U.S. PATENT DOCUMENTS

| 5,905,654 | A  | * | 5/1999 | Tanino et al. ................... 716/55 |
| 6,038,567 | A  |   | 3/2000 | Young |
| 6,239,802 | B1 |   | 5/2001 | Lahey et al. |
| 6,604,231 | B2 |   | 8/2003 | Kaneko |
| 6,670,080 | B2 |   | 12/2003 | Sugita et al. |

(Continued)

FOREIGN PATENT DOCUMENTS

JP    2002202999    7/2002

OTHER PUBLICATIONS

ACD/ChemSketch Tutorial: Drawing Chemical Structures and Graphical Image, Version 8.0 for Microsoft Windows, Advanced Chemistry Development Inc., 2004, pp. 1-134.*

(Continued)

*Primary Examiner* — Jin-Cheng Wang
(74) *Attorney, Agent, or Firm* — DeLizio Gilliam, PLLC

(57) ABSTRACT

Managing diagram elements in a drawing becomes more challenging as the number of diagram elements increases. Placing a new diagram element in a drawing often requires manual movement of one or more other diagram elements within the drawing. Functionality can be implemented within a drawing application to automatically manage diagram elements in a drawing by applying layouts to sets of diagram elements. A drawing tool can associate a set of diagram elements and assigns them a exclusive area or region in the drawing space. Since a layout occupies an exclusive area, the drawing tool can manage the drawing space by automatically moving elements within a first layout when overlap with a second layout is detected. Managing drawing spaces with layouts reduces time spent adjusting diagram elements as a result of applying operations to other elements.

5 Claims, 16 Drawing Sheets

(56) References Cited

U.S. PATENT DOCUMENTS

| | | | |
|---|---|---|---|
| 6,851,105 B1 | 2/2005 | Coad et al. | |
| 6,869,735 B2 | 3/2005 | Tamada et al. | |
| 7,043,487 B2 | 5/2006 | Krishnamurthy et al. | |
| 7,171,646 B2 | 1/2007 | Charisius et al. | |
| 7,181,702 B2 | 2/2007 | Horn | |
| 7,631,004 B2 | 12/2009 | Skibo et al. | |
| 7,900,139 B2* | 3/2011 | Hosotsubo | 715/247 |
| 7,917,851 B1* | 3/2011 | Lettau | 715/273 |
| 2002/0108097 A1* | 8/2002 | Harris et al. | 716/11 |
| 2002/0116418 A1* | 8/2002 | Lachhwani et al. | 707/517 |
| 2003/0067490 A1* | 4/2003 | Murakami | 345/771 |
| 2005/0091626 A1* | 4/2005 | Okano et al. | 716/11 |
| 2005/0149304 A1* | 7/2005 | Harris et al. | 703/9 |
| 2005/0216835 A1 | 9/2005 | Aoki et al. | |
| 2005/0273761 A1 | 12/2005 | Torgerson | |
| 2006/0200759 A1* | 9/2006 | Agrawala et al. | 715/517 |
| 2006/0248480 A1* | 11/2006 | Faraday et al. | 715/866 |
| 2006/0259860 A1* | 11/2006 | Kobashi | 715/521 |
| 2008/0155387 A1* | 6/2008 | Yabe | 715/204 |
| 2009/0199088 A1* | 8/2009 | Haug et al. | 715/244 |
| 2010/0053215 A1 | 3/2010 | Coldicott et al. | |
| 2010/0058162 A1 | 3/2010 | Coldicott et al. | |
| 2011/0016385 A1* | 1/2011 | Kasuga | 715/243 |
| 2011/0029916 A1 | 2/2011 | Unbedacht et al. | |

OTHER PUBLICATIONS

S. Trepalin, et al., "A Java Chemical Structure Editor Supporting the Modular Chemical Descriptor Language (MCDL)", Molecules, vol. 11, pp. 129-141, Mar. 2006.*

"ACD/ChemSketch User's Tutorial", *Advanced Chemistry Development, Inc., Version 8.0 for Microsoft Windows* http://128.178.54.93/Course/aimf/software/WINDOWS/chemsk_tutorial.pdf (Obtained from the Internet on Apr. 8, 2011) 2004 , pp. 8-9, 28-31, 60-62, 108-116.

U.S. Appl. No. 12/198,891 Office Action, Mar. 16, 2011 , 20 pages.

Da Silva, Viviane T., et al., "Using the UML 2.0 Activity Diagram to Model Agent Plans and Actions", *Proceedings of the Fourth international Joint Conference on Autonomous Agents and Multiagent Systems*, The Netherlands. AAMAS '05. ACM, New York, NY, 594-600. http://doi.acm.org/10.1145/1082473.1082563,(Jul. 25-29, 2005).

Ehrler, Lars et al., "Executing Agent UML Diagrams", *In Proceedings of the Third international Joint Conference on Autonomous Agents and Multiagent Systems—Volume 2*, New York, New York. International Conference on Autonomous Agents. IEEE Computer Society, Washington, DC, 906-913. http://dx.doi.org/10.1109/AAMAS.2004.118,(Jul. 19-23, 2004).

Ohst, Dirk et al., "Differences Between Versions of UML Diagrams", *Proceedings of the 9th European Software Engineering Conference Held Jointly with 11th ACM SIGSOFT international Symposium on Foundations of Software Engineering*, Helsinki, Finland. ESEC/FSE-11. ACM, New York, NY. http://doi.acm.org/10.1145/940071.940102,(Sep. 1-5, 2003),227-236.

Merdes, Matthias et al., "Experiences with the Development of a Reverse Engineering Tools for UML Sequence Diagrams: A Case Study in Modern Java Development", *Proceedings of the 4th international Symposium on Principles and Practice of Programming in Java*, Mannheim, Germany. PPPJ '06, vol. 178. ACM, New York, NY. http://doi.acm.org/10.1145/1168054.1168072,(Aug. 30-Sep. 1, 2006),125-134.

Pinzger, Martin et al., "Visualizing multiple evolution metrics", *Proceedings of the 2005 ACM symposium on Software visualization*, St. Louis, Missouri Session: Visualization of the software development process,(2005),pp. 67-75.

Alanen, Marcus et al., "Reconciling diagrams after executing model transformations", *Symposium on Applied Computing*, Proceedings of the 2006 ACM symposium on Applied computing Dijon, France Session: Model transformation (MT 2006),(2006),pp. 1267-1272.

Thomas, Pete et al., "Using patterns in the automatic marking of ER-diagrams", *SIGCSE Bull.* 38, 3, (Sep. 2006),83-87.

Maier, Sonja et al., "A Pattern-Based Layout Algorithm for Diagram Editors", *Proceedings of the Workshop on the Layout of (Software) Engineering Diagrams*, (LED 2007),(2007).

Hosking, John "Confessions of a Meta-Modeller", *Proceedings of the Workshop on the Layout of (Software) Engineering Diagrams*, (LED 2007),(2007).

Stapleton, Gem et al., "Properties of Euler Diagrams", *Proceedings of the Workshop on the Layout of (Software) Engineering Diagrams*, (LED 2007),(2007).

Von Pilgrim, Jens "Mental Map and Model Driven Development", *Proceedings of the Workshop on the Layout of (Software) Engineering Diagrams*, (LED 2007),(2007).

Rayside, Derek et al., "Automatic Visualization of Relational Logic Models", *Proceedings of the Workshop on the Layout of (Software) Engineering Diagrams*, (LED 2007),(2007).

Adachi, Yoshihiro et al., "Logichart: A Prolog Program Diagram and its Layout", *Proceedings of the Workshop on the Layout of (Software) Engineering Diagrams*, (LED 2007).

Storrle, Harald "The LED Diagram Layout Challenge", *Proceedings of the Workshop on the Layout of (Software) Engineering Diagrams*, (LED 2007),(2007).

Sugihara, K. et al., "Layout-by-example: a fuzzy visual language for specifyingstereotypes of diagram layout", *Visual Languages, 1992. Proceedings., 1992 IEEE Workshop on*, Meeting Date: Sep. 15, 1992-Sep. 18, 1992 Location: Seattle, WA, USA,(Sep. 15-18, 1992),88-94.

Gogolla, Martin "Towards three-dimensional representation and animation of UML diagrams", *"UML" '99—Unified Modeling Language*, Beyond the Standard. Second International Conference. Proceedings (Lecture Notes in Computer Science vol. 1723) Springer-Verlag, Berlin, Germany, xvii+724,(1999),489-502.

Higgins, Colin A., et al., "Formative Computer Based Assessment in Diagram Based Domains", *Proceedings of the 11th Annual SIGCSE Conference on Innovation and Technology in Computer Science Education*, ITiCSE 2006, Bologna, Italy, Jun. 26-28, 2006,(2006),98-102.

Kagdi, H. et al., "On Using Eye Tracking in Empirical Assessment of Software Visualizations", *Proceedings of the ACM Workshop on Empirical Assessment of Software Engineering Languages and Technologies*, colocated with ASE'07,(Nov. 5, 2007),pp. 21-22.

Grundy, John et al., "Supporting Generic Sketching-Based Input of Diagrams in a Domain-Specific Visual Language Meta-Tool", *Proceedings of the 29th International Conference on Software Engineering*, (May 20-26, 2007),p. 282-291.

Meyer, B. et al., "Interpretation of Visual Notations in the Recopla Editor Generator", *Formalizing Reasoning with Visual and Diagrammatic Representations*, FRVDR '98: AAAI Fall Symposium, Orlando, USA, Menlo Park: AAAI Press.,(Oct. 23-25, 1998),pp. 107.

U.S. Appl. No. 12/198,889 Office Action, Oct. 6, 2011 , 29 pages.

U.S. Appl. No. 12/198,891 Final Office Action, Sep. 16, 2011 , 24 pages.

Biafore, Bonnie , "Visio 2007 Bible", Wiley Apr. 2007 , 27 pages.

U.S. Appl. No. 12/198,889 Final Office Action, Mar. 30, 2012 , 18 pages.

U.S. Appl. No. 12/198,891 Final Office Action, Dec. 12, 2012 , 25 pages.

U.S. Appl. No. 12/198,891 Office Action, Mar. 21, 2013 , 21 pages.

"U.S. Appl. No. 12/198,891 Final Office Action", Nov. 5, 2013, 30 Pages.

* cited by examiner

AUTOMATIC MANAGEMENT OF DIAGRAM ELEMENTS

BACKGROUND

Embodiments of the inventive subject matter generally relate to the field of drawing applications, and, more particularly, to automatic management of diagram elements.

Operations performed on diagram elements in a drawing created in drawing applications, such as Microsoft Visio® and IBM® Rational® Software Architect, may cause unwanted side effects on other diagram elements in the drawing. Diagram elements comprise shapes, symbols, icons, text, images, etc. that can be used in a drawing (e.g., circles, lines, unified modeling language (UML) class representations, etc). Adding a new diagram element, resizing a diagram element or moving a diagram element may cause diagram elements to overlap or effect the spacing of diagram elements. A user manually adjusts diagram elements to correct spacing or overlaps.

SUMMARY

Embodiments include a method that detects selection of one or more of diagram element instances in a drawing space of a drawing application to apply a layout. The one or more diagram element instances are associated with each other and with a unique area of the drawing space. An indication of the association of the one or more diagram element instances and the unique area of the drawings space is stored as a layout instance of the drawing application.

BRIEF DESCRIPTION OF THE SEVERAL DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to drawing applications, embodiments can be implemented in other applications such as web based document editing applications and computer aided drafting applications. In other instances, well-known instruction instances, protocols, structures and techniques have not been shown in detail in order not to obfuscate the description.

Manually changing properties of each diagram element placed in a drawing becomes tedious. A significant amount of time is spent manually customizing diagram elements creating or editing a drawing. Functionality can be implemented within a drawing application to allow automatic diagram element customization based on a set of diagram element policies. Diagram policies specify conditions for customizing properties of a diagram element. Automatic customization of diagram elements reduces time spent creating drawings because diagram elements will be placed in a drawing in their desired configurations.

Figure 1:
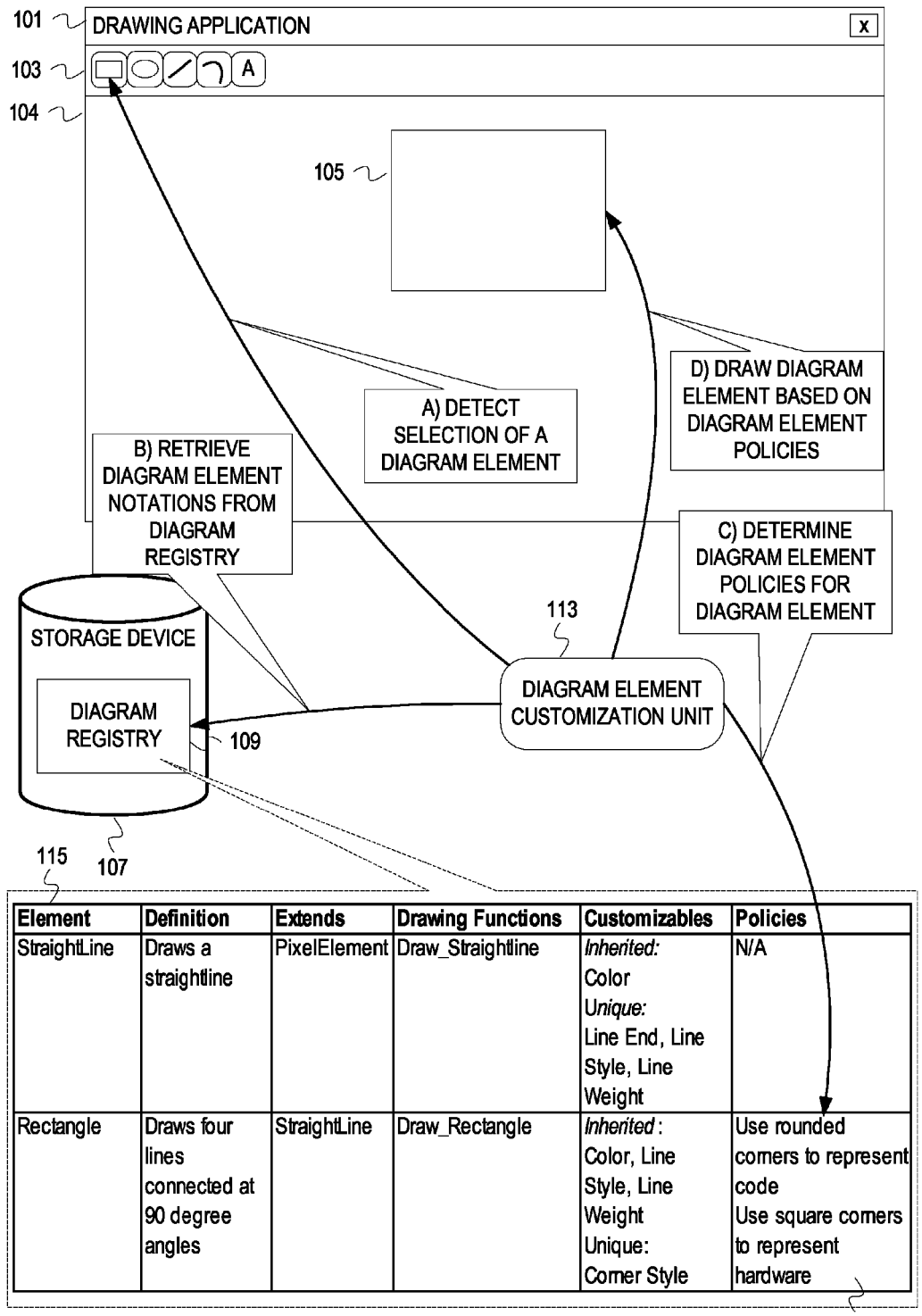
FIG. 1 depicts an example conceptual diagram of customizing diagram elements based on diagram element policies.

FIG. 1 depicts an example conceptual diagram of customizing diagram elements based on diagram element policies. A drawing application 101 comprises a toolbar 103 and a drawing space 104. The toolbar 103 comprises a set of buttons and/or menus that allow a user to place diagram elements in the drawing space 104. Diagram elements comprise shapes, symbols, icons, text, images, etc that can be used in a drawing (e.g., circles, lines, representations of unified modeling language (UML) classes, etc).

At stage A, a diagram element customization unit 113 detects selection of a diagram element to add to the drawing space 104. Examples of detecting a selection of a diagram element include detecting a click on a toolbar button, detecting a click on a diagram element in a list, detecting dragging a diagram element to a drawing space, etc. In this case, the desired diagram element is a rectangle.

At stage B, the diagram element customization unit 113 retrieves diagram element notations 115 from a diagram registry 109 in storage device 107. The diagram registry 109 may be hosted on a server or on a computer running the drawing application 101. If the diagram registry 109 is hosted on a server, a local copy of the diagram registry may be cached on the computer. The diagram registry 109 contains an entry for each diagram element that may be used in a drawing. Each entry is comprised of a set of diagram element notations. Diagram element notations are detailed descriptions of diagram elements used by the drawing tool to draw diagram elements. In this example, the diagram element notations 115 comprise fields for diagram element name, definition of the diagram element, any diagram elements that the element is extended from, references to drawing functions, properties that are customizable, and diagram element policies.

A first diagram element is extended from a second diagram element when the second diagram element is used to draw a part of the first element. For example, a rectangle extends a straight line because four straight lines connected at 90 degree angles are used to draw a rectangle. Properties such as font size, line weight, color, corner style, etc. are considered customizable. Customizable properties may be inherited by a first diagram element from a second diagram element that when the first diagram element extends the second diagram element. For example, the customizable property line weight for a rectangle is inherited from the straight line. Diagram element policies may be inherited by a first diagram element from a second diagram element in addition to inherited properties when the first diagram element extends the second diagram element.

At stage C, a diagram element customization unit 113 determines diagram element policies 117 for the diagram element 105 from the diagram registry 109. The diagram element policies 117 specify conditions for automatically customizing properties of the diagram element 105 when the diagram element is drawn in the drawing space 104. In this case, the diagram element policies 117 for the rectangle diagram element 105 specify two conditions for corner styles: 1) use rounded corners to represent code and 2) Use square corners to represent hardware.

At stage D, the diagram element customization unit 113 draws the diagram element instance 105 on the drawing space 104 based on the diagram element policies 117. Drawing a diagram element based on diagram element policies comprises executing one or more drawing functions that determine which conditions in the diagram element policies should be applied to the diagram element in the drawing context. In some cases, conditions may refer to a single property of a diagram element, so one condition will be applied to the diagram element. For example, conditions may be specified for the color of a task diagram element in a project schedule diagram use red color if the task is critical, otherwise use blue color. In other cases, conditions may refer to multiple properties of a diagram element, so more than one condition may be applied to the diagram element. For example, conditions may be specified for the color and line end properties of a line diagram element—if the line connects a server diagram element to a network diagram element, use arrows at both ends of the line and use green color. The diagram element customization unit 113 determined that the diagram element instance 105 should be drawn with square corners. Determining which conditions to apply to a diagram element is based on one or more of the type of drawing, other diagram elements already existing in the drawing, user interaction, etc.

Although examples refer to customizing a diagram element when it is placed in the drawing, embodiments are not so limited. Properties of a diagram element instance already existing in the drawing may automatically be changed if the context around the diagram element changes. For example, conditions may be specified for the color of a server diagram element when it is connected to a firewall element in a network diagram. The color of a server diagram element already existing in a diagram may change color when a firewall is connected to it. In addition, diagram elements that are copied and pasted into a drawing will be customized based on the context of the drawing they are pasted into and may not retain the same values for customizable properties as the diagram element they were copied from.

Figure 2:
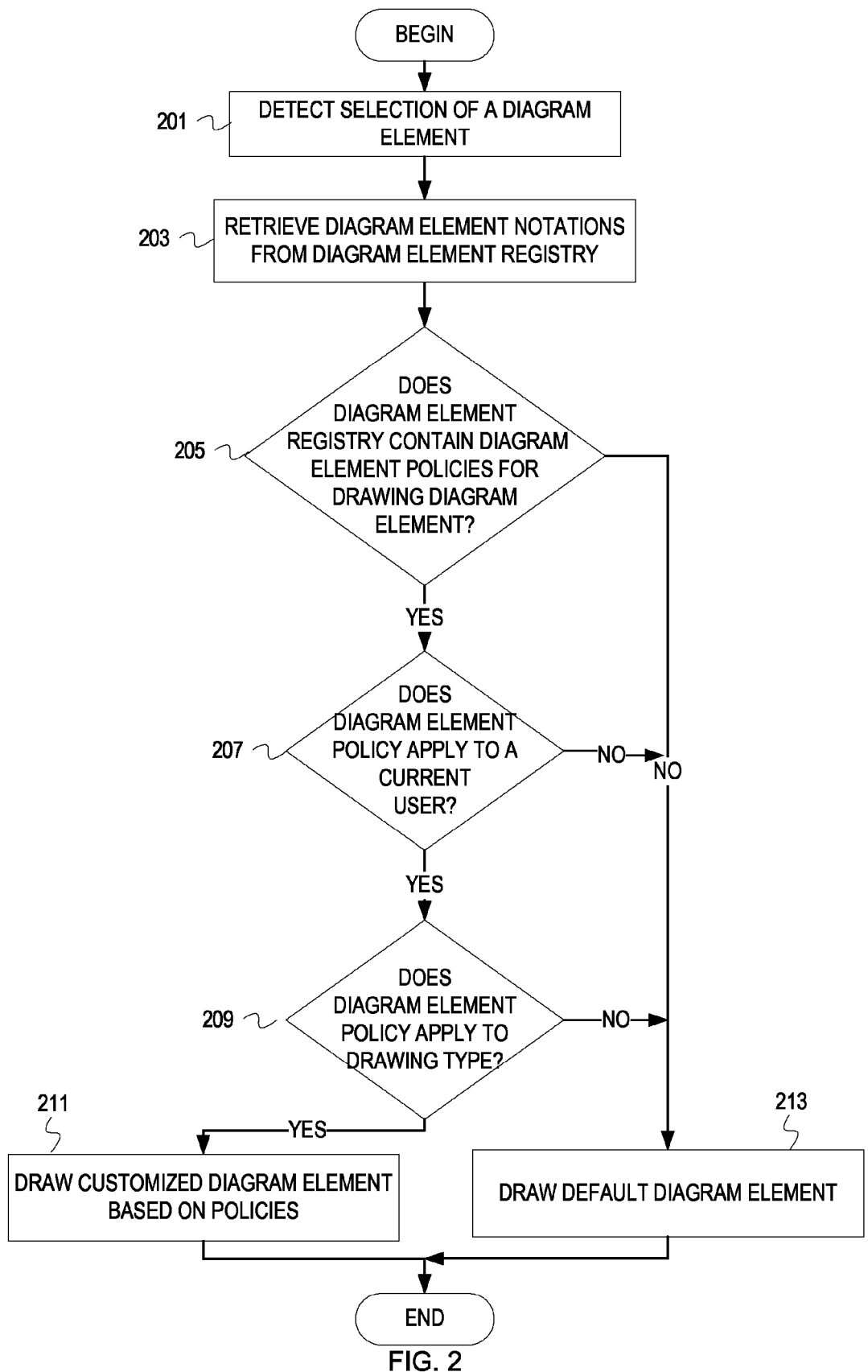
FIG. 2 depicts a flowchart of example operations for customizing a diagram element based on a policy.

FIG. 2 depicts a flowchart of example operations for customizing a diagram element based on a policy. Flow begins at block 201, where selection of a diagram element is detected. Diagram elements may be selected from a drop down menu, a toolbar, a library, a list, etc.

At block 203, diagram element notations are retrieved from a diagram element registry.

At block 205, it is determined if the diagram registry contains policies for drawing the diagram element. If the diagram registry does contain policies for drawing the diagram element, flow continues at block 207. If the diagram registry does not contain policies for drawing the diagram element, flow continues at block 213.

At block 207, it is determined if the diagram element policy applies to a current user. Diagram element policies may be specified for members of a workgroup within a company or for a single user. If the diagram element policy does apply to the current user, flow continues at block 209. If the diagram element policy does not apply to the current user, flow continues at block 213.

At block 209, it is determined if the diagram element policy applies to the drawing type. For example, diagram element policies that change the color of a server diagram element in a network diagram would not change the color of the server diagram element if it is used as an icon in a newsletter. If the diagram element policy applies to the drawing type, flow continues at block 211. If the diagram element policy does not apply to the drawing type, flow continues at block 213.

At block 211, a customized diagram element instance is drawn based on the policies.

At block 213, a default diagram element instance is drawn.

Figure 3:
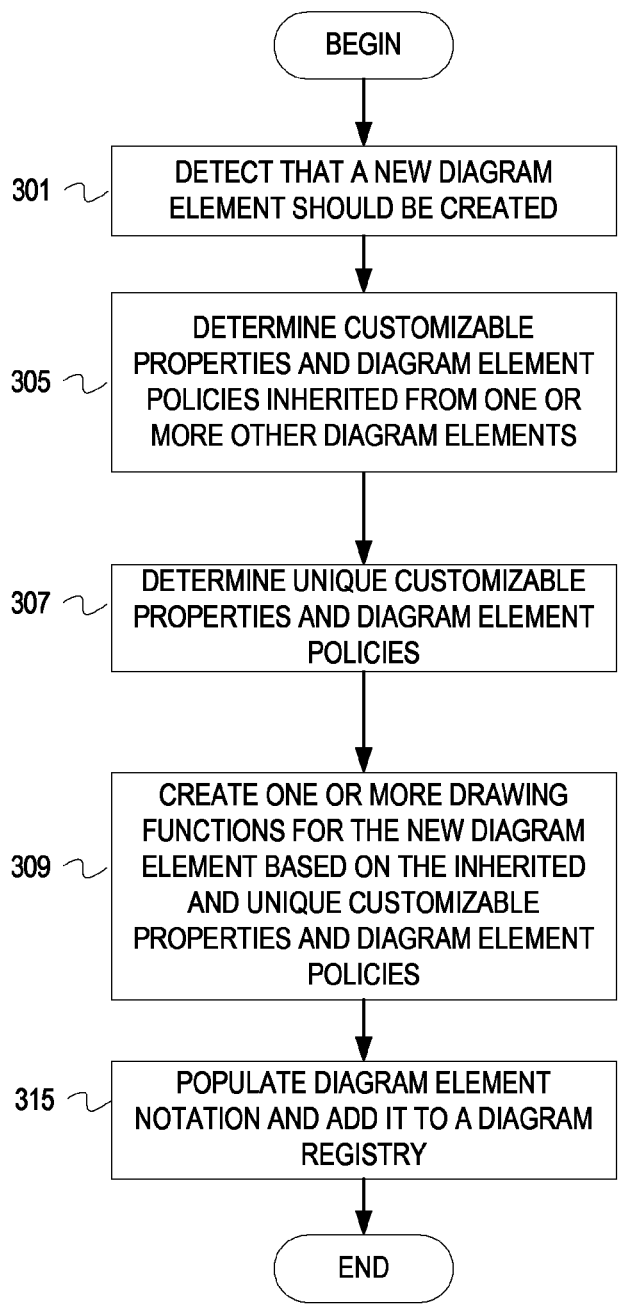
FIG. 3 depicts a flowchart of example operations for adding a new diagram element to a diagram registry.

In some cases, a user of a drawing application may desire to create a new diagram element. In addition to diagram element notations, new diagram elements can be added to the diagram element registry. FIG. 3 depicts a flowchart of example operations for adding a new diagram element to a diagram registry. Flow begins at block 301, where it is detected that a new diagram element should be created. Examples of detecting that a new diagram element should be created include detecting that a create new diagram element wizard has completed, detecting click of a new diagram element button, etc.

At block 305, the customizable properties and diagram element policies inherited from one or more other diagram elements are determined. Inheritance occurs because new diagram elements are extended (i.e., made) from other diagram elements that exist in a diagram registry. However, a new diagram element may not inherit every customizable property or diagram element policy from building block diagram elements. For example, a user draws a server using existing diagram elements (e.g., rectangles, lines, text boxes, etc). The user selects the diagram elements instances comprising the server and indicates that a new diagram element should be created. The server inherits customizable properties such as color and line weight, but does not inherit customizable properties such as corner style. A rectangle that makes up a side of the server has a customizable property, corner style. When the rectangle is drawn as part of the server, the corner style property of the rectangle is determined (e.g., user selects square corners) and becomes fixed. Inheritance of diagram element policies may be determined manually. For example, a user specifies which diagram element policies should be inherited. Inheritance policies may also be determined automatically. For example, a line diagram element instance is drawn as part of a building that is a new diagram element. A diagram element policy may apply to the line end customizable property of the line when the line connects an actor diagram element with a use case diagram element. Since the line is part of the building and the line end customizable property is fixed, it is determined that the diagram element policy for the line end customizable property is not inherited by the building diagram element.

At block 307, unique customizable properties and diagram element policies are determined. For example, a rectangle is drawn with four lines. When the rectangle becomes a new diagram element, corner style becomes a unique customizable property. Unique diagram element policies are indicated by a user. In some cases, there may be no unique diagram element policies for the diagram element.

At block 309, one or more drawing functions are created for the new diagram element based on the inherited and unique customizable properties and diagram element policies. The drawing functions may call one or more drawing functions of the diagram elements that make up the new diagram element. For example, a drawing function for a rectangle diagram element, calls a drawing function for a line diagram element. The diagram element policies are implemented as a set of conditions within the drawing functions for the new diagram element.

At block 315, a diagram element notation is populated with information determined in blocks 305-309 and is added to the diagram element registry. The diagram element notation stores information such as the diagram element name, description, which diagram elements the new diagram element is extended from, references to the one or more drawing functions, customizable properties and diagram element policy descriptions.

Diagram element notations in a diagram registry can be displayed at the request of a user. In some embodiments, users can select to view a subset of diagram element notations in the diagram registry. In other embodiments, the entire set of diagram element notations is displayed.

The diagram registry may be created in a drawing application on a first computer and exported to be used by a drawing application on a second computer. The diagram registry may be exported as a text file, an extensible markup language (XML) file, etc. In some embodiments, drawing functions may be exported along with the diagram element notations. In other embodiments, drawing functions are not exported, so the drawing application on the second computer may create or edit drawing functions based on the diagram element notations when the diagram registry is imported. In addition, diagram registries may be exported and imported between two different drawing applications. For example, a diagram registry used in Microsoft Visio may be exported to be used in IBM Rational Software Architect. In some embodiments, an existing diagram registry in a second drawing application may be overwritten when a new diagram registry is imported. In other embodiments, the existing diagram registry in a second drawing application is updated by importing the new diagram registry.

Figure 4:
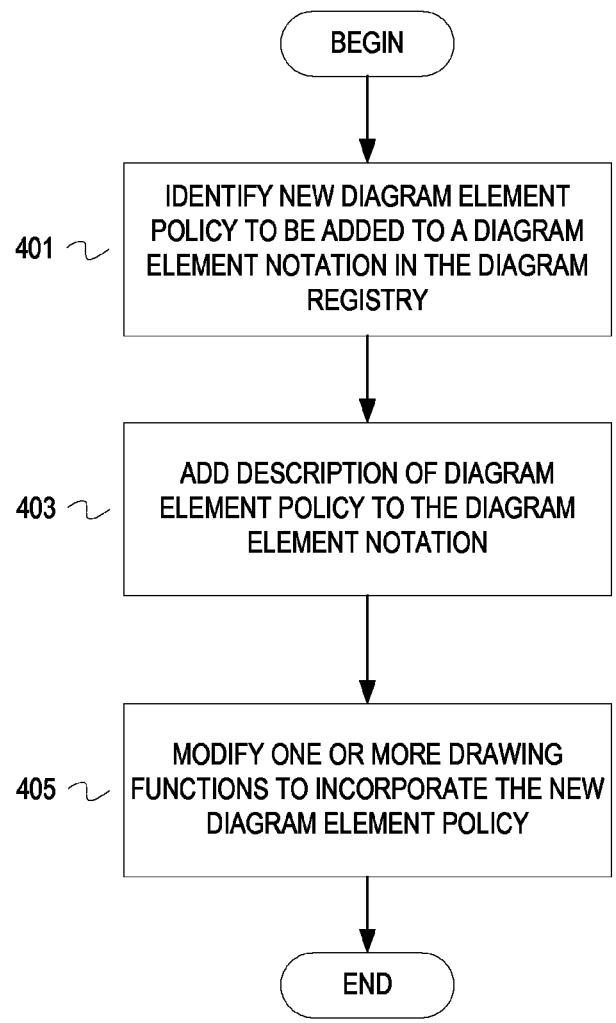
FIG. 4 depicts a flowchart of example operations for adding a diagram element policy to a diagram registry.

FIG. 4 depicts a flowchart of example operations for adding a diagram element policy to a diagram registry. Flow begins at block 401, where a new diagram element policy to be added to the diagram registry is identified. Examples of identifying a new diagram element policy include detecting the completion of an add diagram element policy wizard, entry of a formula into a dialog box, etc.

At block 403, a description of the diagram element policy is added to the diagram element notation. The description of the policy can be text based, audio based, image based, etc. In some embodiments, the description may be generated automatically when the new diagram element policy is input. In other embodiments, a user may enter a description for the policy (e.g., in response to a prompt, by typing in a text field, etc.).

At block 405, one or more drawing functions are modified to incorporate the new diagram element policy. The one or more drawing functions draw a diagram element in a drawing space and customize the diagram element's properties based on a set of diagram element policies. In this embodiment, code implementing the diagram element policy is directly inserted into the drawing functions of a drawing application's source code. For example, a new drawing application is developed that includes a modifiable section of code in its diagram element drawing functions. The modifiable section of code is used by the drawing application to implement diagram element policies. In some embodiments, the drawing applications source code may not be accessible. When the drawing source code is not accessible a drawing script is created based on the diagram element policies. For example, a plug-in for an existing drawing application is created to allow automatic customization of diagram elements based on diagram element policies. Calls to the drawing functions made by the drawing application are redirected to the drawing script that implements the diagram policies. The drawing script formats calls to the drawing functions to automatically configure diagram element properties based on the diagram element policies. For example, a script implementing diagram element policies for a flowchart block diagram element determines that the flowchart block diagram element is to be drawn in yellow, with a font size of 12 and italicized. The script calls drawing functions that cause the color to be yellow, the font size to be 12 and font effects to be italics.

Although examples refer to adding new diagram element policies, embodiments are not so limited. Existing diagram element policies may be edited or deleted. Editing or deleting a diagram element policy can modify the one or more drawing functions.

Managing diagram elements in a drawing becomes more challenging as the number of diagram elements increases. Placing a new diagram element in a drawing often requires manual movement of one or more other diagram elements within the drawing. Functionality can be implemented within a drawing application to automatically manage diagram elements in a drawing by applying layouts to sets of diagram elements. A drawing tool can associate a set of diagram elements and assigns them a exclusive area or region in the drawing space. Associating a set of diagram elements allows operations to be applied to the entire set of diagram elements simultaneously. For example, all of the diagram elements in a layout can be resized at the same time. Since a layout occupies an exclusive area, the drawing tool can manage the drawing space by automatically moving elements within a first layout when overlap with a second layout is detected. Managing drawing spaces with layouts reduces time spent adjusting diagram elements as a result of applying operations to other elements.

Figure 5:
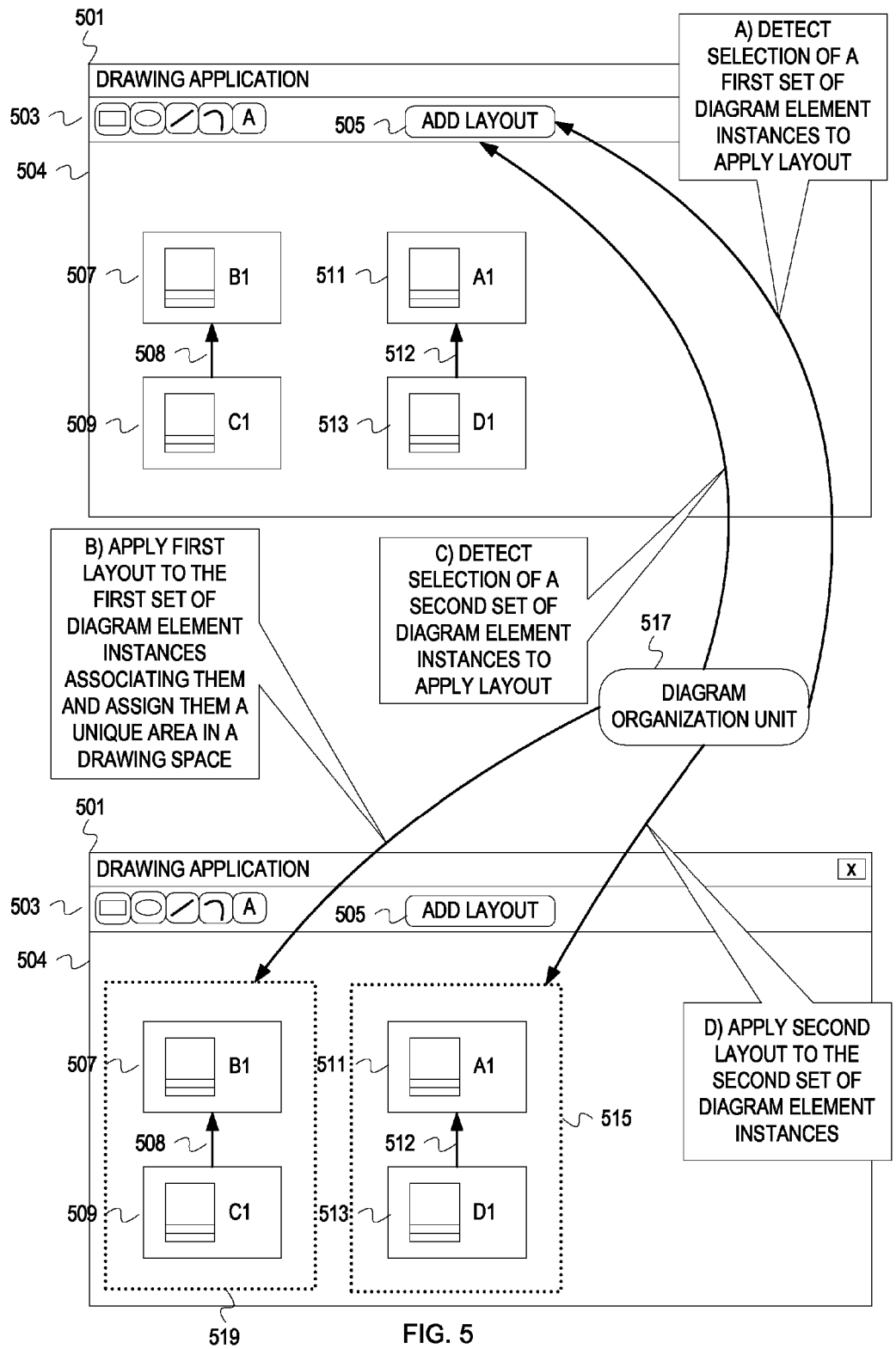
FIG. 5 depicts an example conceptual diagram of applying layouts to sets of diagram element instances.

FIG. 5 depicts an example conceptual diagram of applying layouts to sets of diagram element instances. A drawing application 501 comprises a toolbar 503 and a drawing space 504. The toolbar 503 comprises a set of buttons and/or menus that allow a user to place and manipulate diagram elements in the drawing space 504. The toolbar contains an add layout button 505 that applies layouts to sets of diagram elements. Six diagram element instances 507, 508, 509, 511, 512 and 513 are in the drawing space 504.

At stage A, a diagram organization unit 517 detects selection of a first set of diagram element instances to apply a first layout. Examples of detecting selection of a set of diagram elements to apply a layout include detecting a click on a toolbar button, detecting a selection from a drop down menu, etc. In this example, the diagram organization unit 517 detects a click on the add layout button 505.

At stage B, a first layout 519 is applied to the first set of diagram element instances associating the first set of diagram elements and assigning them an exclusive area in the drawing space. The first set of diagram element instances comprises three diagram element instances 507, 508 and 509. The association of the three diagram element instances 507, 508 and 509 allows operations to be applied to the three diagram element instances 507, 508 and 509 simultaneously. A layout may be any shape (e.g., circle, square, cloud, rectangle, etc) or may be drawn free hand. In this example, the layout 519 is a rectangle. Applying a layout to a set of diagram elements comprises determining coordinates of a boundary of the layout and associating the layout with the set of diagram element instances. When a layout is applied to a set of diagram element instances, the layout can be considered as containing the set of diagram element instances. A layout is a virtual container that allows a user to view diagram element instance associations and apply operations to associated diagram element instances simultaneously. Although the boundaries of layouts may be displayed during creation and editing of a drawing, the boundaries disappear when the drawing is finalized (e.g., printed, exported, etc.). In addition, layouts may be typed. For example, a layout in a drawing may restrict placement of diagram elements into the layout to actor diagram elements. As another example, a layout in a drawing may allow any diagram element to be placed in the layout except for a use case diagram element.

More than one layout may be defined for a drawing space. At stage C, the diagram organization unit 517 detects selection of a second set of diagram element instances to apply a second layout. At stage D, the diagram organization unit 517 applies a second layout 515 to the second set of diagram element instances. The second set of diagram elements comprises three diagram element instances 511, 512 and 513.

Although examples refer to applying layouts to diagram element instances already existing in a drawing space, embodiments are not so limited. A layout may be added to a drawing space that does not contain any diagram element instances. In this case, diagram element instances will be associated with the layout as they are placed in the layout.

Figure 16:
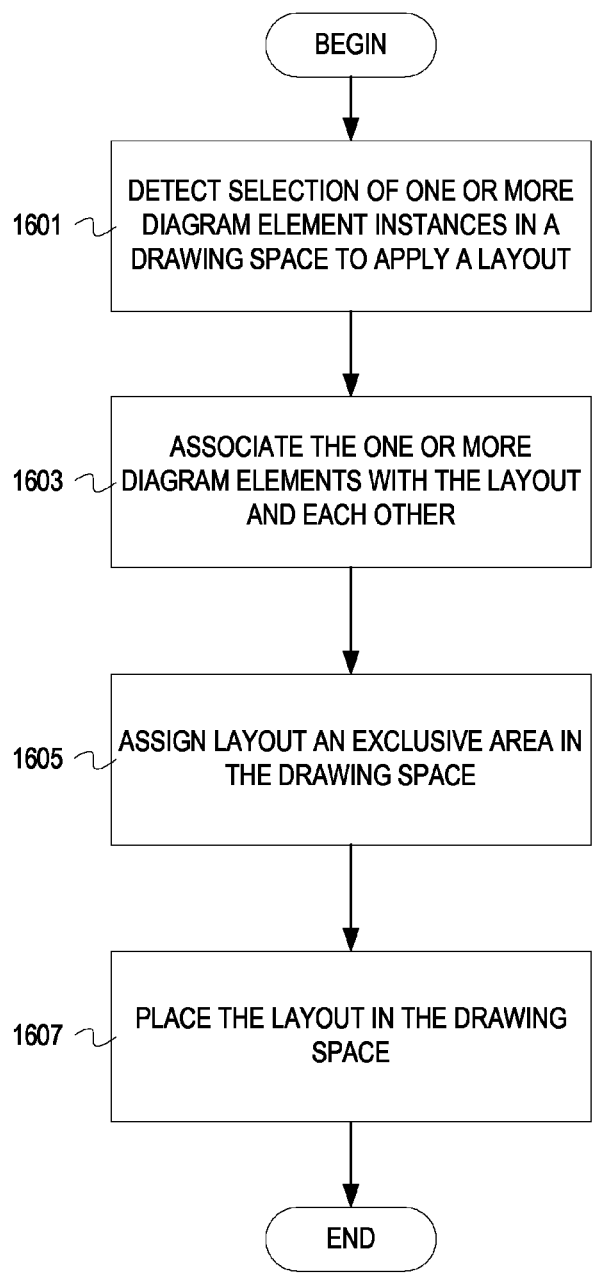
FIG. 16 depicts a flowchart of example operations for applying a layout to one more diagram element instances.

FIG. 16 depicts a flowchart of example operations for applying a layout to one more diagram element instances. Flow begins at block 1601, where a selection to apply a layout to one or more diagram element instances in a drawing space is detected.

At block 1603, the one or more diagram element instances are associated with the layout and with each other. The layout contains the diagram element instances and operations may be applied to the associated diagram element instances simultaneously.

At block 1605, the layout is assigned an exclusive area in the drawing space. Coordinates for a border of the layout are determined based on the shape and size of the layout. The area that the layout occupies in the drawing space is considered to be exclusive because not other layouts cannot occupy the same area.

Layouts are assigned exclusive areas in a drawing space, so layouts do not overlap. However, a layout may contain other layouts in addition to diagram elements ("nested layout"). For example, a first layout may contain a second and third layout that divides the first layout into two sections. The first layout that is nested within the second layout occupies an exclusive area within the second layout.

At block 1607, the layout is placed in the drawing.

Figure 6:
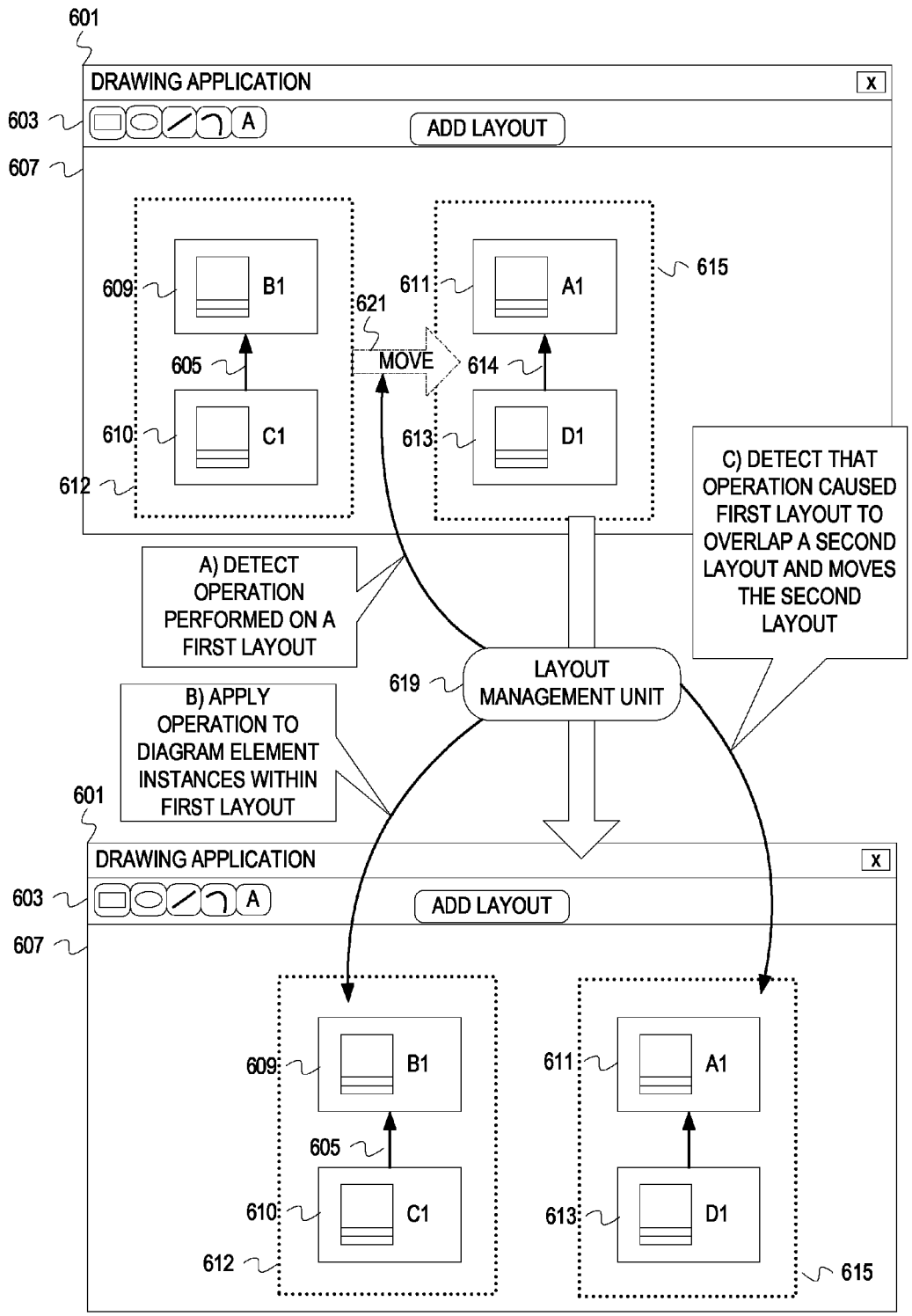
FIG. 6 depicts an example conceptual diagram of automatically managing a drawing space using layouts.

Operations on layouts in a drawing space may cause a layout to overlap one or more other layouts. A drawing application can automatically correct overlaps in a drawing space. FIG. 6 depicts an example conceptual diagram of automatically managing a drawing space using layouts. A drawing application 601 comprises a toolbar 603 and a drawing space 607. Six diagram element instances 605, 609, 610, 611, 613 and 614 are in the drawing space 607. A first layout 614 contains the three diagram element instances 605, 609 and 610. A second layout 615 contains the three diagram element instances 611, 613 and 614.

At stage A, a layout management unit 619 detects an operation 621 performed on the first layout 612. Examples of operations include resize, move, remove, copy, etc. In this example, the operation 621 moves the first layout 612.

At stage B, the layout management unit 619 applies the operation 621 to diagram element instances within the first layout 612. The first layout 612 and diagram element instances 605, 609 and 610 are moved to the right in the drawing space 607.

At stage C, the layout management unit 619 detects that the operation 621 caused the first layout 612 to overlap the second layout 615. The layout management unit 619 moves the second layout 615 to correct the overlap. The second layout 615 and diagram element instances 611, 612 and 613 are moved to the right in the drawing space. The drawing application could move the layout that violated the overlap restriction, in this case the first layout 612.

Figure 7:
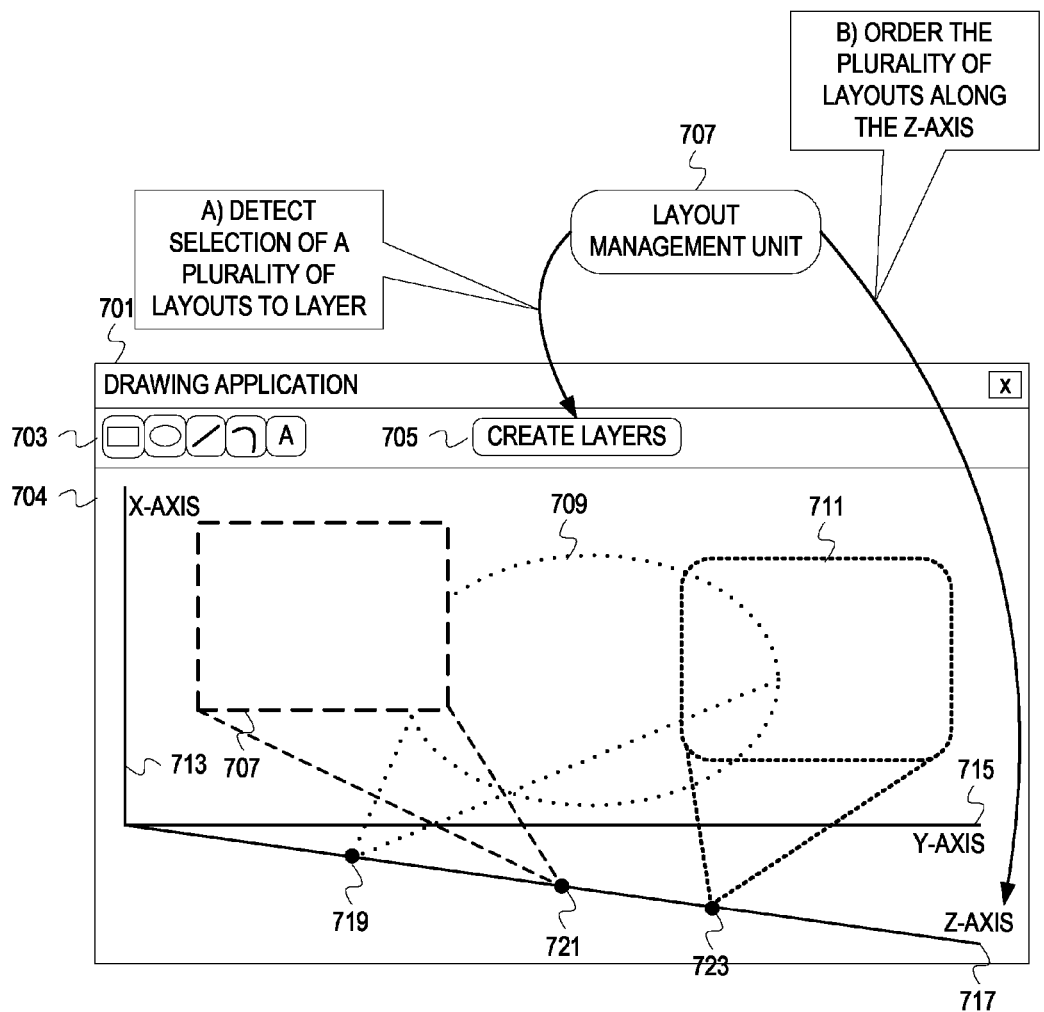
FIG. 7 depicts an example conceptual diagram of layering layouts in a drawing space.

By default, layouts do not overlap within a drawing space. A user may, however, desire to create a drawing with overlapping layouts. Layouts may be assigned to exclusive areas on different planes within a drawing space to allow layouts to seemingly overlap ("layered"), while still occupying an exclusive area within a plane of the drawing space. FIG. 7 depicts an example conceptual diagram of layering layouts in a drawing space. A drawing application 701 comprises a toolbar 703 and a drawing space 704. The toolbar 703 comprises a set of buttons and/or menus that allow a user to place and manipulate diagram elements in the drawing space 704. The toolbar contains a create layers button 705 that layers more than one layout in a drawing. Three layouts 707, 709 and 711 are in the drawing space 704.

At stage A, a layout management unit 707 detects selection of a plurality of layouts to layer. Examples of detecting selection of layouts to layer include detecting a click on a toolbar button, detecting a selection from a drop down menu, etc. In this example, the layout management unit 707 detects a click on the create layers button 705.

By default, layouts 707, 709 and 711 occupy exclusive areas on a plane in the drawing area 704 defined by an x-axis 713 and a y-axis 715. At stage B, the layout management unit orders the layouts 707, 709 and 711 along a z-axis 717. Ordering the layouts along the z-axis comprises placing one or more layouts on different x-y planes. In this example, layout 707 is on a plane crossing the z-axis 717 at a point 721, layout 709 is on a plane crossing the z-axis 717 at a point 719 and layout 711 is on a plane crossing the z-axis at point 723. Layout 723 is the top layer. Layout 707 is in front of layout 709, but behind layout 723. Layouts in a layered drawing may be opaque or transparent.

Changing a location of a layout along the z-axis may be accomplished by dragging and dropping the intersection point to a new location on the z-axis. The axes depicted in FIG. 7 are implemented in the drawing application similar to a ruler. In some embodiments, a layout that is currently being edited is automatically brought to the foreground for visual purposes to allow for straightforward editing. The location of the layout is not changed along the z-axis when the layout is selected for editing.

Figure 8:
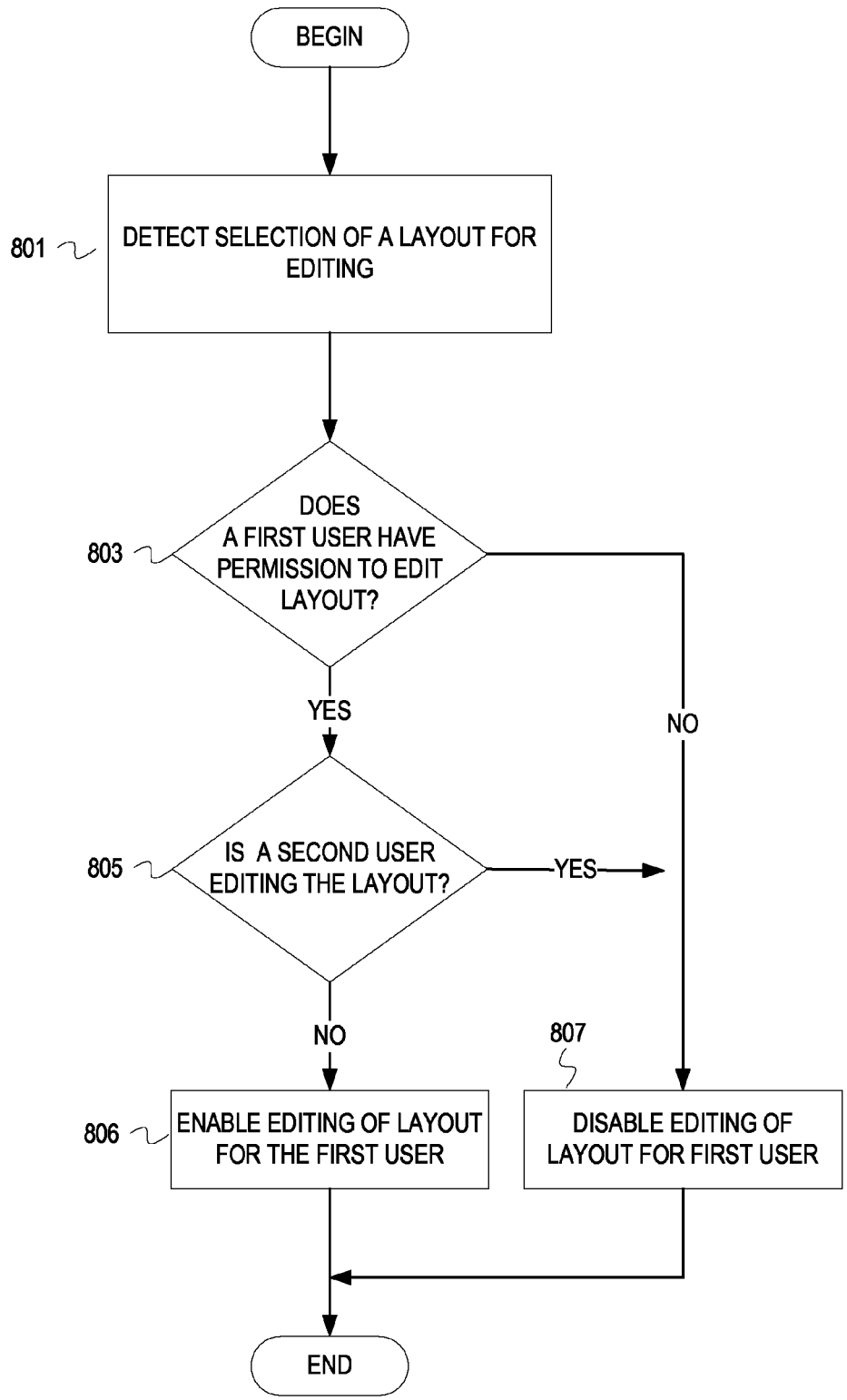
FIG. 8 depicts a flowchart of example operations for disabling the ability to edit a layout.

Editing of one more layers within a drawing may be disabled. FIG. 8 depicts a flowchart of example operations for disabling the ability to edit a layout. Flow begins at block 801, where selection of a layout for editing is detected. Examples of detecting selection of a layout for editing include detecting a click on the layout, detecting an operation performed on the layout, detecting addition of a diagram element to the layout, etc.

At block 803, it is determined if a first user has permission to edit the layout. For example, a layout containing header information such as the company logo and contact information is part of a drawing. The header layout may be read-only to prevent unauthorized or accidental changes. If the first user has permission to edit the layout, flow continues at block 805. If the first user does not have permission to edit the layout, flow continues at block 807.

At block 805, it is determined if a second user is editing the layout. For example, a drawing may be a webpage comprising two layouts. The webpage may be edited simultaneously by more than one user, but editing privileges may restrict editing of a layout to one user. If the second user is not editing the layout, flow continues at block 806. If the second user is editing the layout, flow continues at block 807.

At block 806, editing of the layout is enabled for the first user.

At block 807, editing of the layout is disabled for the first user.

A diagram registry can be expanded to include layouts and layout policies. Examples of layout polices include restrictions on the types of diagram elements that can be placed in a layout, restrictions on editing privileges, locations of typed layouts, etc. Diagram element notations may also be expanded to place layouts when a diagram element is placed. For example, a diagram element policy may specify the shape of a layout containing a diagram element instance that is placed when the diagram element instance is placed. As another example, a diagram element policy may specify that a new layout to contain the diagram element instance be placed with the diagram element instance if the diagram element instance is not placed in an existing layout.

In addition to customizable diagram elements and layouts, a drawing application can identify and utilize an arrangement of diagram element instances and/or layouts ("patterns") in drawings. Users of drawing applications can utilize patterns to efficiently create diagrams as users tend to create similar drawings over time. For example, a user may create two use case diagrams. The first use case diagram depicts use cases for driving a car and the second use case diagram depicts use cases for driving a motorcycle. The use cases and structure of the diagrams are similar. Functionality may be implemented within a drawing application to determine a pattern from a drawing and create a new drawing based on the pattern. Creating a new drawing based on a pattern reduces time spent creating similar drawings because a user is able to edit the new pattern based drawing instead of creating the new drawing from scratch.

Figure 9:
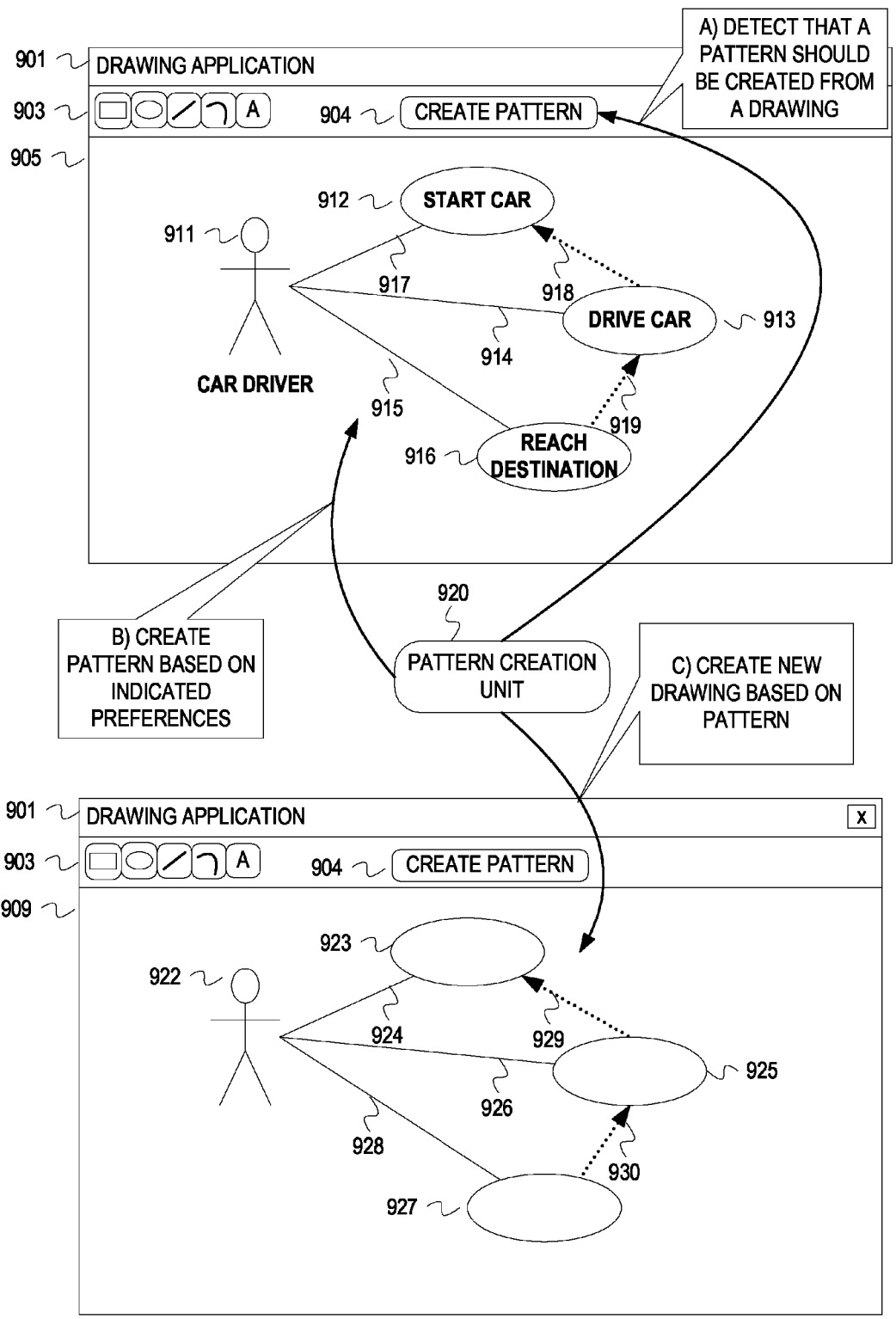
FIG. 9 depicts an example conceptual diagram of creating a new drawing based on a pattern.

FIG. 9 depicts an example conceptual diagram of creating a new drawing based on a pattern. A drawing application 901 comprises a toolbar 903 and a drawing space 905. The toolbar 903 comprises a set of buttons and/or menus that allow a user to place and manipulate diagram elements in the drawing space 905. The toolbar contains a create pattern button 904 that determines a pattern from a first drawing and creates a second drawing from the pattern. Diagram element instances 911, 912, 913, 914, 915, 916, 917, 918 and 919 are in the drawing space.

At stage A, a pattern creation unit 920 detects that a pattern should be created from a reference drawing. Examples of determining that a pattern should be created include detecting a click on a toolbar button, detecting selection from a drop down menu, etc. In this example, the pattern creation unit 920 detects a click on the create pattern button 904.

At stage B, the pattern creation unit 920 creates a pattern from the reference drawing in drawing space 905 based on indicated preferences. To create a pattern, the pattern creation unit 920 determines which diagram elements in the drawing space 905 should be instantiated in the pattern based on the indicated preferences. Preferences may be indicated by a user, based on default values, dynamically derived based on use history, etc. In this example, indicated preferences specify that diagram elements be instantiated in the pattern without label text.

At stage C, a new drawing space 909 is opened and a new drawing is created based on the pattern. Diagram element instances in the new drawing in drawing space 909 are configured the same as drawing element instances in the reference drawing in drawing space 905, except that text labels for the diagram element instances are empty in the new drawing. In some embodiments, a pattern may be saved and used as a template to create future drawings. In other embodiments, a drawing is created from the pattern, but the pattern is not saved for future use.

Figure 10:
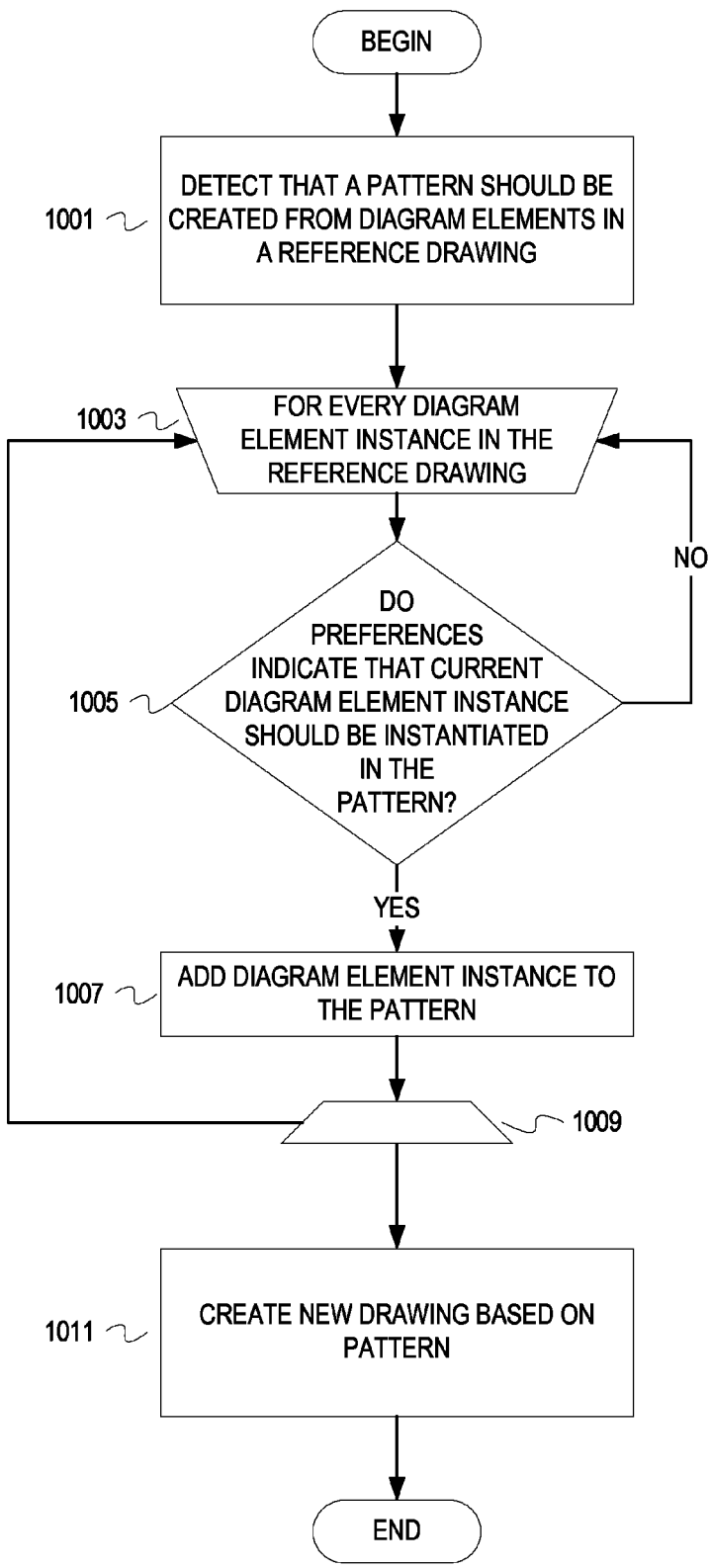
FIG. 10 depicts a flowchart of example operations for creating a new drawing based on a pattern.

FIG. 10 depicts a flowchart of example operations for creating a new drawing based on a pattern. Flow begins at block 1001, where it is detected that a pattern should be created from diagram elements in a reference drawing. For example, a user indicates that a pattern should be created from a drawing by selecting an option in a drop down menu.

At block 1003, a loop begins for every diagram element in the reference drawing.

At block 1005, it is determined if preferences indicate that a current diagram element should be represented in the pattern. Examples of preferences include represent all diagram elements, represent all diagram elements but disregard color properties of the diagram elements, do not represent line elements, etc. If preferences indicate that the current diagram element should be represented in the pattern, flow continues at block 1007. If preferences indicate that the current diagram element should not be represented in the pattern, flow returns to block 1003.

At block 1007, the diagram element instance is added to the pattern. For example, a flowchart terminator diagram element is in the drawing and preferences indicate that all diagram elements should be represented. A flowchart terminator will be placed in a new drawing created from the pattern.

At block 1009, the loop ends.

At block 1011, a new drawing is created based on the pattern.

Figure 11:
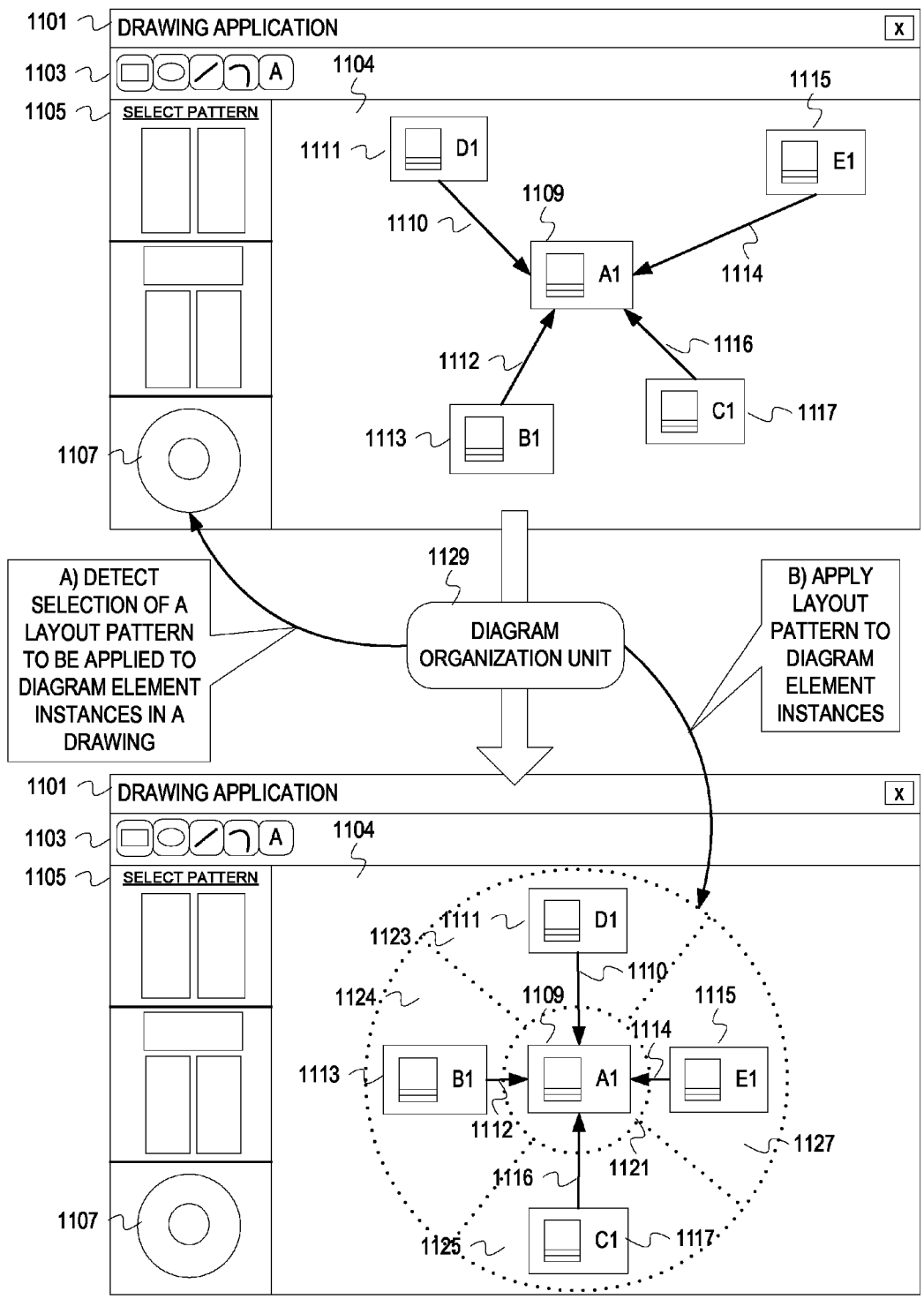
FIG. 11 depicts an example conceptual diagram of applying a layout pattern to diagram elements in a drawing.

Patterns may also be an arrangement of layouts or a mixed arrangement of elements and layouts. FIG. 11 depicts an example conceptual diagram of applying a layout pattern to diagram elements in a drawing. A drawing application 1101 comprises a toolbar 1103, a select pattern frame 1105 and a drawing space 1104. The toolbar 1103 comprises a set of buttons and/or menus that allow a user to place and manipulate diagram elements in the drawing space 1104. The select pattern frame 1105 displays a list of available layout patterns that may be applied to diagram elements in the drawing space 1104. Diagram elements 1109, 1110, 1111, 1112, 1113, 1114, 1115, 1116 and 1117 are in the drawing space 11104.

At stage A, a diagram organization unit 1129 detects selection of a layout pattern 1107 to be applied to diagram elements in a drawing. Examples of detecting a selection of a layout pattern include detecting a selection from a list of options, detecting completion of a layout pattern wizard, etc. Layout pattern 1107 is a concentric circle pattern to arrange diagram elements around a central diagram element.

At stage B, the diagram organization unit 1129 applies the layout pattern to the diagram elements. Applying a layout pattern comprises placing a layout pattern in the drawing and associating diagram elements with one or more layouts that comprise the pattern. The drawing organization unit 1129 determines that diagram element 1109 should be placed in the center circle layout 1121 because the other diagram elements 1111, 1113, 1115 and 1117 are mostly arranged around diagram element 1109 and are connected to diagram element 1109 by line diagram elements 1110, 1112, 1114 and 1116. Diagram elements 1111, 1113, 1115 and 1117 are placed in four layouts 1123, 1124, 1127 and 1125 respectively. Layouts 1123, 1124, 1125 and 1127 make up an outer circle. A number of layouts in the outer circle is determined by a number of diagram elements to be arranged around a center diagram element. The outer circle is divided into the number of layouts to space outer diagram elements evenly.

Figure 12:
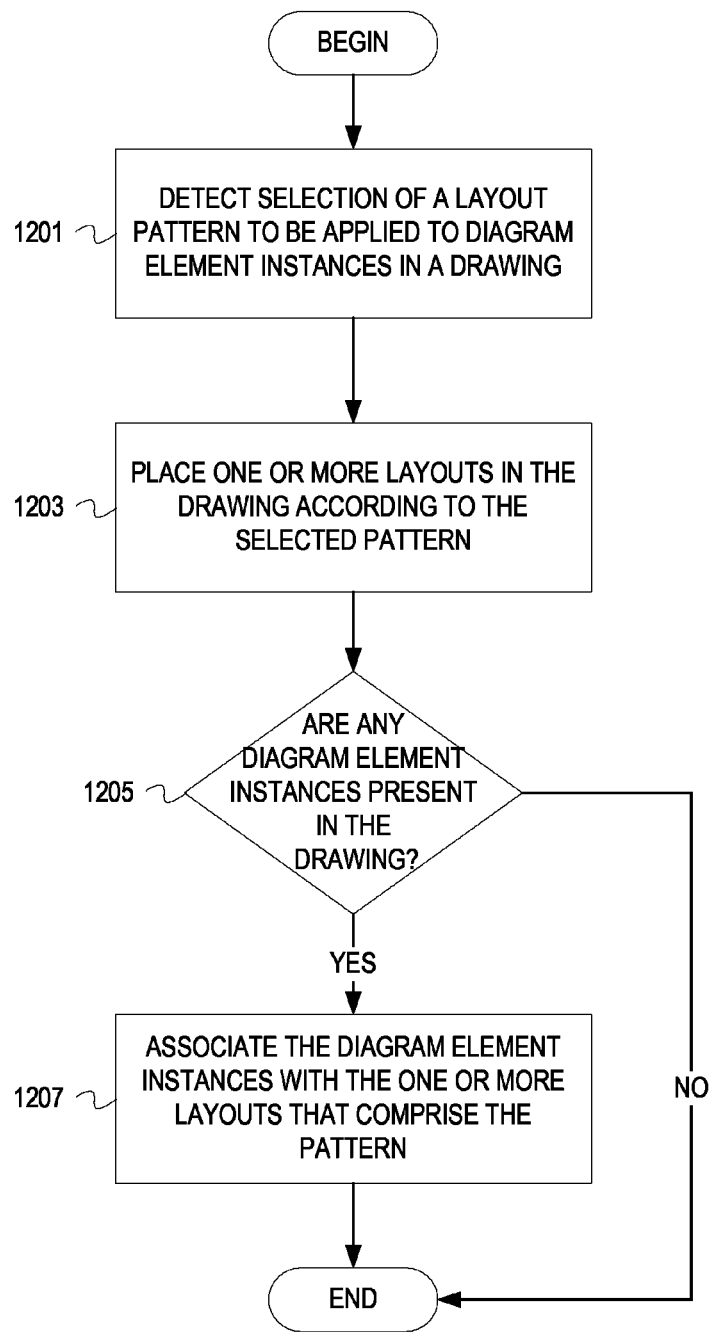
FIG. 12 is depicts a flowchart of example operations for applying a layout pattern to diagram elements in a drawing.

FIG. 12 is depicts a flowchart of example operations for applying a layout pattern to diagram elements in a drawing. Flow begins at 1201, where selection of a layout pattern to be applied to elements in a drawing is detected.

At block 1203, one or more layouts are placed in the drawing according to the selected layout pattern. Layouts in a pattern may be of any shape, may be typed, etc.

At block 1205, it is determined if any diagram elements are present in the drawing. If any diagram elements are present in the drawing, flow continues at block 1207. If no diagram elements are present in the drawing, flow ends.

At block 1207, diagram elements are associated with the one or more layouts that comprise the pattern.

Figure 13:
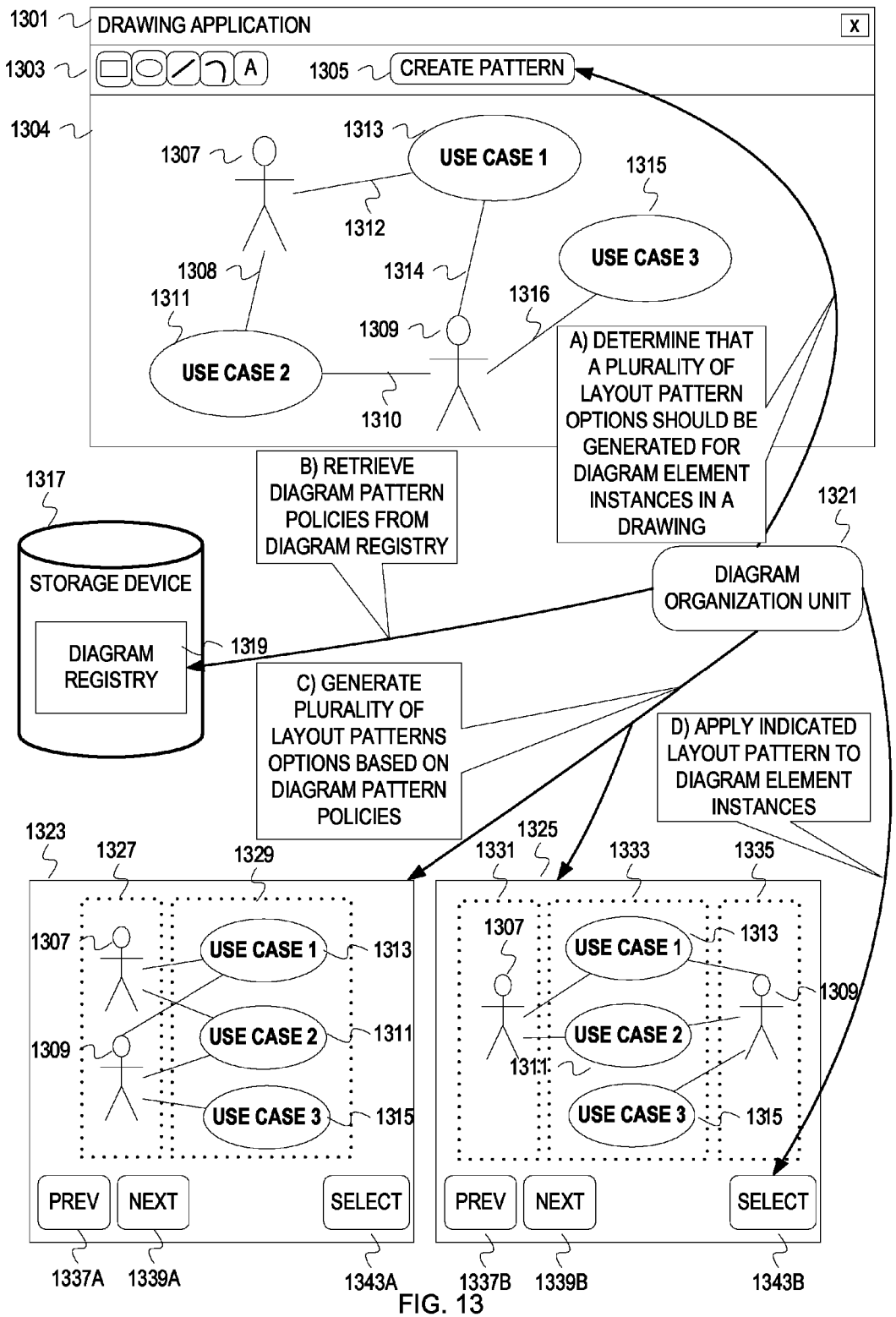
FIG. 13 depicts an example conceptual diagram of generating layout patterns for diagram elements in a drawing based on diagram pattern policies.

Layout patterns may be automatically generated based on a set of diagram pattern policies in a diagram registry. FIG. 13 depicts an example conceptual diagram of generating layout patterns for diagram elements in a drawing based on diagram pattern policies. A drawing application 1301 comprises a toolbar 1303 and a drawing space 1304. The toolbar 1303 comprises a set of buttons and/or menus that allow a user to place diagram elements in the drawing space 1304. The toolbar contains a create pattern button 1305 that generates layout pattern options for diagram elements in a diagram. Diagram elements 1307, 1308, 1309, 1310, 1311, 1312, 1313, 1314, 1315 and 1316 are in the drawing space 1305.

At stage A, a diagram organization unit 1321 determines that a plurality of layout pattern options should be generated for diagram elements in a drawing. Examples determining that a plurality of layout pattern options should be generated include detecting click of a toolbar button, detecting a selection from a drop down menu, etc. In this example the diagram organization unit 1321 detects a click on the create pattern button 1305.

At stage B, the diagram organization unit 1321 retrieves diagram pattern policies from a diagram registry 1319. The diagram registry is hosted by storage device 1317. In this example, a diagram pattern policy specifies that actor diagram elements in a use case diagram should be on the left and/or right of the diagram and use case diagram elements should be in the center or right of the diagram.

At stage C, a plurality of layout pattern options is generated based on diagram pattern polices. In some embodiments, the layout pattern options are displayed in a slide show. Each slide displays one of the plurality of layout patterns. The slide show can be used to preview layout pattern options before applying them to diagram elements in a drawing. In this example, two layout patterns are generated and displayed on slides 1323 and 1325. Slide 1323 displays a first layout pattern option that arranges actor diagram elements 1307 and 1309 in a typed layout 1327 on the right. Use case diagram elements 1311, 1313 and 1315 are arranged in a typed layout 1329 on the left. Slide 1325 displays a second layout pattern option that arranges the actor diagram element 1307 in a first typed layout 1331 on the left and actor diagram element 1309 in second typed layout 1335 on the left. Use case diagram elements 1311, 1313 and 1315 are arranged in a typed layout 1333 in the center. Typed layouts 1327, 1331, and 1335 only allow actor diagram elements to be associated with them. Typed layouts 1329 and 1333 only allow use case diagram elements to be associated with them. Connections made by diagram elements 1308, 1310, 1312 and 1316 are maintained in layout options displayed on slides 1323 and 1325, but labels are not shown to maintain clarity of the figure.

Previous buttons 1337A and 1337B, next buttons 1339A and 1339B, and select buttons 1343A and 1343B are shown on slides 1323 and 1325 respectively. Previous buttons 1337A and 1337B display a previous slide. Next buttons 1339A and 1339B display a next slide. Select buttons 1343A and 1343B select a layout pattern option currently displayed on a slide to be applied to the pattern. Previous buttons 1337A and 1337B and next buttons 1339A and 1339B may be grayed-out if there is no previous or next slide. In some embodiments, additional buttons may be shown on slides. Examples of additional buttons include a remember button, a skip button, a layout button, etc. The remember button remembers a current layout pattern option and displays it again. The skip button skips the current layout and does not show it again. The layouts button chooses layouts to be used in the slide show.

At stage D, an indicated layout pattern is applied to the diagram elements. A layout pattern is indicated by a user of the drawing application. In this example, the user indicates the pattern by clicking the select button 1343B.

Figure 14:
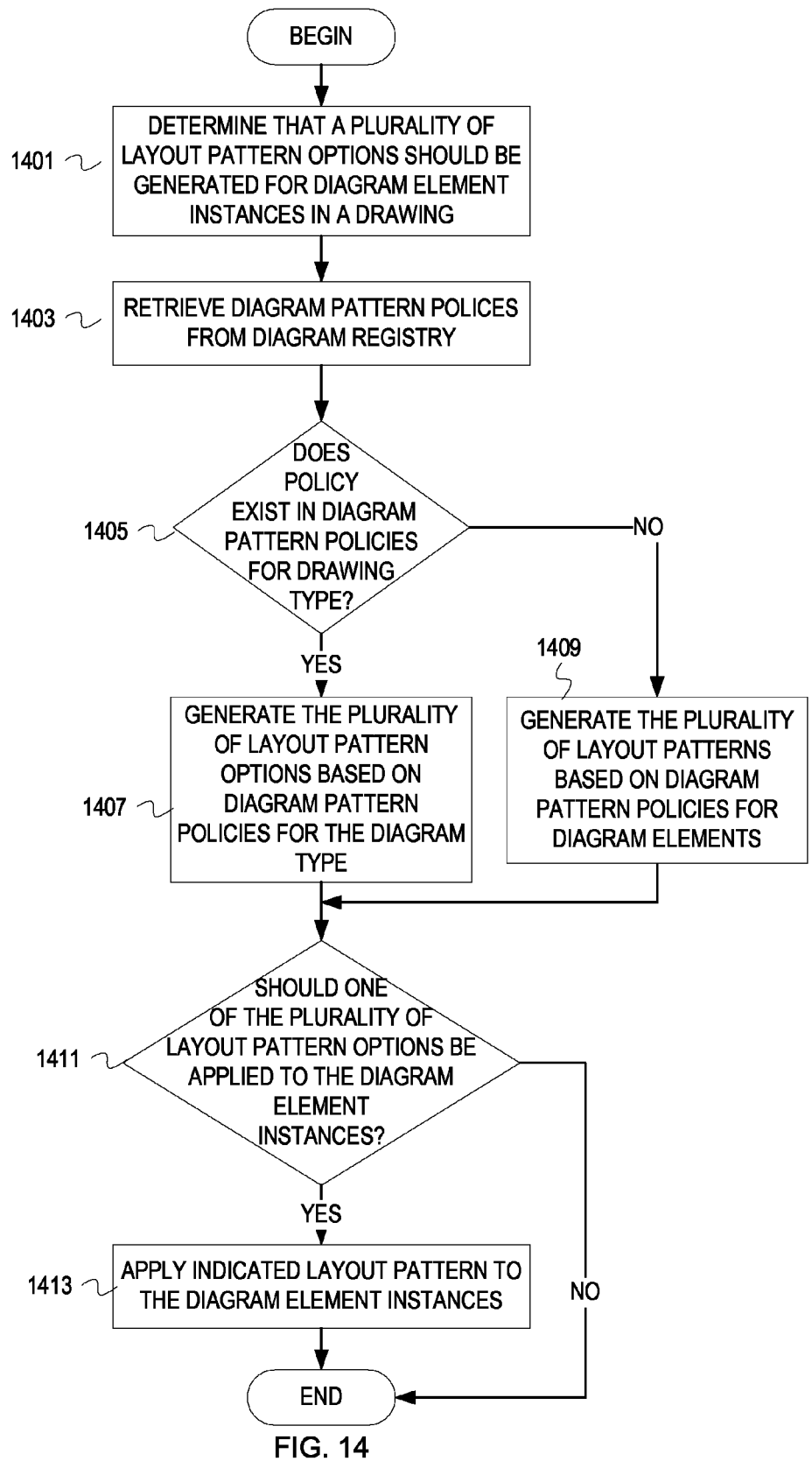
FIG. 14 depicts a flowchart of example operations for generating layout pattern options for diagram elements in a drawing.

FIG. 14 depicts a flowchart of example operations for generating layout pattern options for diagram elements in a drawing. Flow begins at block 1401, where it is determined that a plurality of layout pattern options should be generated for diagram elements in a drawing.

At block 1403, diagram pattern policies are retrieved from a diagram registry. Diagram pattern policies may apply to diagram elements and/or diagram types. Examples of diagram pattern policies include use a concentric layout pattern if a more than one diagram element is arranged around a single diagram element, use a rectangular pattern comprising two side by side layouts if there are one more image diagram elements and more than one bulleted text diagram elements, etc. Diagram pattern policies can specify more than one acceptable configuration for diagram elements in a specific drawing type. For example, a policy may specify that consecutive diagram elements in a flowchart drawing may be either placed below or to the right-of a previous diagram element.

At block 1405, it is determined if a policy exists in diagram pattern policies for a diagram type. If a policy exists in the diagram pattern policies for the diagram type, flow continues at block 1407. If a policy does not exist in the diagram pattern policies for the diagram type, flow continues at block 1409.

At block 1407, the plurality of layout pattern options is generated based on diagram pattern policies for the diagram type.

At block 1409, the plurality of layout pattern options is generated based on diagram pattern policies for diagram elements. For example, a policy may specify to use a rectangular layout pattern comprised of two layouts when an image diagram element and a text block diagram element are in a drawing. The two layouts may be arranged side-by-side or top-and-bottom.

At block 1411, it is determined if one of the plurality of layout pattern options should be applied to the diagram elements. A plurality of layout pattern options may be generated, but not selected to be applied to the diagram elements. For example, a user views the plurality of layout pattern options and decides that none of the layouts fit his or her purpose in the drawing. If one of the plurality of layout pattern options should be applied to the diagram elements, flow continues at block 1413. If none of the plurality of layout pattern options should be applied to the diagram elements, flow ends.

At block 1413, an indicated layout pattern is applied to the diagram elements.

It should be understood that the depicted flowchart are examples meant to aid in understanding embodiments and should not be used to limit embodiments or limit scope of the claims. Embodiments may perform additional operations, fewer operations, operations in a different order, operations in parallel, and some operations differently. For instance, referring to FIG. 2, the operations for determining if the diagram element policy applies to a current user and determining if the diagram element policy applies to the drawing type may be interchanged or executed in parallel. Referring to FIG. 8, operations for determining if a first user has permission to edit a layout and determining if a second user is editing a layout may be switched.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 15:
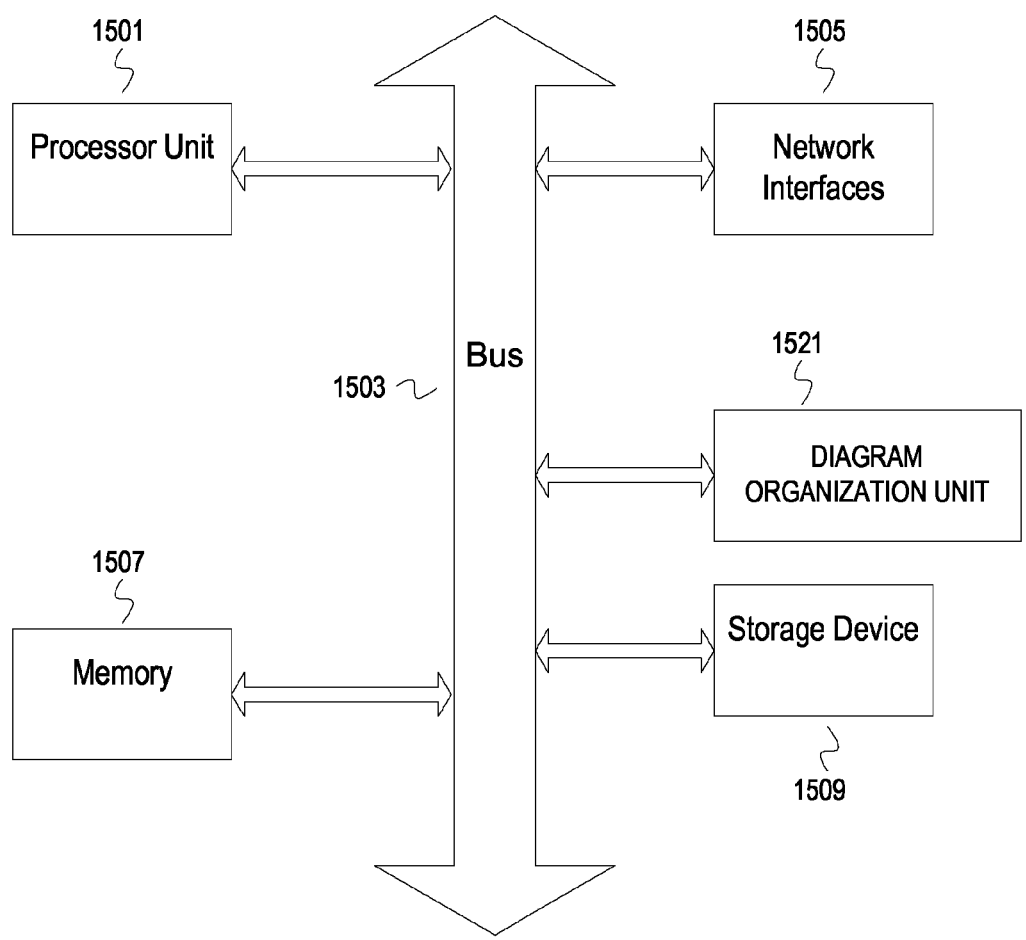
FIG. 15 depicts an example computer system.

FIG. 15 depicts an example computer system. A computer system includes a processor unit 1501 (possibly including multiple processors, multiple cores, multiple nodes, and/or implementing multi-threading, etc.). The computer system includes memory 1507. The memory 1507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1503 (e.g., PCI, ISA, PCI-Express, HyperTransport®, InfiniBand®, NuBus, etc.), a network interfaces 1505 (e.g., an ATM interface, an Ethernet interface, a Frame Relay interface, SONET interface, wireless interface, etc.), and a storage device(s) 1509 (e.g., optical storage, magnetic storage, etc.). The computer system includes a diagram element customization unit 1521 that customizes diagram elements in a drawing based on diagram element notations in a diagram registry. Any one of these functionalities may be partially (or entirely) implemented in hardware and/or on the processing unit 1501. For example, the functionality may be implemented with an application specific integrated circuit, in logic implemented in the processing unit 1501, in a co-processor on a peripheral device or card, etc. Further, realizations may include fewer or additional components not illustrated in FIG. 15 (e.g., video cards, audio cards, additional network interfaces, peripheral devices, etc.). The processor unit 1501, the storage device(s) 1509, and the network interface 1505 are coupled to the bus 1503. Although illustrated as being coupled to the bus 1503, the memory 1507 may be coupled to the processor unit 1501.

While the embodiments are described with reference to various implementations and exploitations, it will be understood that these embodiments are illustrative and that the scope of the inventive subject matter is not limited to them. In general, techniques for automatically customizing diagram elements as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining, by a device, that an operation on a first layout instance will cause the first layout instance to overlap with a second layout instance in a same plane of a drawing space, wherein the first layout instance comprises at least one instance of a first diagram element associated with a first unique area in the drawing space and the second layout instance comprises at least one instance of a second diagram element associated with a second unique area in the drawing space;

automatically pushing away, by the device, one of the first layout instance and the second layout instance to obviate all overlaps;

detecting, by the device, selection of a new diagram element instance to be added to the drawing space;

retrieving, by the device, diagram element notations for the new diagram element instance, the diagram element notations comprising a diagram element policy that defines conditions for customizing properties of the new diagram element instance relative to a drawing context for the drawing space, wherein the drawing context comprises at least one of a type of drawing being drawn in the drawing space and other drawing elements already in the drawing, other drawing elements in the drawing that the new diagram element instance is connected;

responsive to determining that the diagram element policy is applicable to at least one of a current user creating the drawing and the type of drawing, by the device, a customized diagram element instance in the drawing based on the conditions defined by the diagram element policy, wherein the conditions comprise at least one of the type of drawing, other diagram elements existing in the drawing in the drawing space, and user interaction; and responsive to determining that the diagram element policy is not applicable to at least one of the current user creating the drawing and the type of drawing, by the device, a default diagram element instance in the drawing independent of the conditions defined by the diagram element policy.

2. The method of claim 1, wherein said automatically moving, by the device, one of the first layout instance and the second layout instance to obviate the overlap comprises automatically moving, by the device, the one of the first layout instance and the second layout instance into one of a different region of the drawing space in the same plane and a different plane of the drawing space.

3. The method of claim 1, wherein said determining, by the device, that the operation on the first layout instance will cause the first layout instance to overlap with the second layout instance in the same plane of the drawing space comprises:

determining, by the device, that the first layout instance and the second layout instance reside in the same plane; and comparing, by the device, boundaries of the first layout instance and the second layout instance.

4. The method of claim 1 further comprising performing, by the device, the operation on the first layout instance.

5. The method of claim 1, wherein the conditions comprise the type of drawing, other diagram elements existing in the drawing in the drawing space, and user interaction.

* * * * *